United States Patent
Yamagata et al.

(10) Patent No.: US 8,573,962 B2
(45) Date of Patent: Nov. 5, 2013

(54) HIGH-PRESSURE TREATMENT APPARATUS

(75) Inventors: Masahiro Yamagata, Takasago (JP); Katsumi Watanabe, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 486 days.

(21) Appl. No.: 12/988,680

(22) PCT Filed: Jun. 5, 2009

(86) PCT No.: PCT/JP2009/060346
§ 371 (c)(1),
(2), (4) Date: Oct. 20, 2010

(87) PCT Pub. No.: WO2009/154089
PCT Pub. Date: Dec. 23, 2009

(65) Prior Publication Data
US 2011/0030186 A1    Feb. 10, 2011

(30) Foreign Application Priority Data
Jun. 18, 2008    (JP) ................................ 2008-159202

(51) Int. Cl.
B29C 43/10    (2006.01)
B22F 3/15    (2006.01)

(52) U.S. Cl.
USPC .......................... 425/405.2; 425/815; 432/199

(58) Field of Classification Search
USPC ..................... 425/78, 170, 405.1, 405.2, 815; 432/199; 219/400
See application file for complete search history.

(56) References Cited

U.S. PATENT DOCUMENTS 6,514,066 B1 * 2/2003 Bergman .................... 425/405.2
7,008,210 B2 * 3/2006 Manabe et al. ............ 425/405.2

FOREIGN PATENT DOCUMENTS

| JP | 2 21189 | 1/1990 |
| JP | 2 21191 | 1/1990 |
| JP | 2 21193 | 1/1990 |
| JP | 2 245146 | 9/1990 |
| JP | 7 268635 | 10/1995 |
| JP | 2003-340261 | 12/2003 |
| JP | 2003 340261 | 12/2003 |
| JP | 2007 309626 | 11/2007 |
| TW | 66062 | 2/1984 |

OTHER PUBLICATIONS

International Search Report issued Sep. 1, 2009 in PCT/JP09/60346 filed Jun. 5, 2009.

(Continued)

Primary Examiner — Richard Crispino
Assistant Examiner — Thukhanh Nguyen
(74) Attorney, Agent, or Firm — Oblon, Spivak, McClelland, Maier & Neustadt, L.L.P.

(57) ABSTRACT

The objective is to provide a high-pressure treatment apparatus with which the pressure or temperature in a treatment chamber can be efficiently adjusted in a short period of time without an overall significant increase in the size or complication of the apparatus. The high-pressure treatment apparatus has a pressure-resistant container having pressure-resistant walls surrounding a treatment chamber, a lid member that closes an open end of the pressure-resistant container, a supply means that supplies a process fluid into the treatment chamber, a partition wall that is thinner than the pressure-resistant wall and is provided along the inside surface of said pressure-resistant container to form a partitioned chamber with said inside surface, and a heat transfer control means. Said heat transfer control means controls heat transfer between said treatment chamber and said partitioned chamber by heating or cooling a heating medium outside the container and feeding said heating medium into said partitioned chamber.

15 Claims, 3 Drawing Sheets

(56) References Cited

OTHER PUBLICATIONS

Japanese Office Action Issued Jan. 8, 2013 in Patent Application No. 2009-144305 (with English translation).

Notification of Examination Opinion issued Dec. 14, 2011 in Taiwanese Application No. 098119937 (with English translation).

Search Report issue Dec. 14, 2011 in Taiwanese Application No. 098119937 (with English translation of Category of Cited Documents).

* cited by examiner

HIGH-PRESSURE TREATMENT APPARATUS

FIELD OF THE INVENTION

The present invention relates to a high-pressure treatment apparatus used for high-pressure treatment using supercritical carbon dioxide, hot isostatic press treatment, or the like.

BACKGROUND ART

In recent years, various techniques are being developed to impart functionality to a treatment object member by use of supercritical fluid. The supercritical fluid, which is a fluid placed under temperature and pressure of a critical point or more, has the feature of having both diffusivity of gas and solubility of liquid. Among such supercritical fluids, particularly, supercritical carbon dioxide is excellent as solvent since it vaporizes at the critical point or lower, and thus has been actively examined for uses such as dyeing, plating, or water-repellent coating to resin sheet, resin film or the like.

On the other hand, the hot isostatic press treatment, which is a technique for treating a treatment object while maintaining high temperature and high pressure, is used, for example, for processing or formation of cemented carbide, ceramics, and superalloy.

Both the high-pressure treatments are performed within a pressure-resistant container provided with a pressure resisting structure. Since these treatments are generally performed in a high-temperature state, rapid heating or cooling of the pressure-resistant container or maintaining of the temperature of the pressure-resistant container is needed to rapidly perform the treatments.

For example, Patent Literature 1 discloses a high-pressure treatment apparatus, including a pressure-resistant wall surrounding a treatment chamber and a jacket provided outside it, in which the treatment chamber is heated or cooled by supplying a heating medium into the jacket. This apparatus has the potential to enhance the heating rate or cooling rate within the treatment chamber by heating or cooling the heating medium in addition to heating or cooling of a pressure medium fed into the treatment chamber.

On the other hand, Patent Literature 2 discloses a high-pressure treatment apparatus, including a pressure-resistant wall and an inverted cup-shaped partition wall provided inside it, in which a treatment chamber is formed inside the partition wall. In this apparatus, a partitioned chamber is formed between the partition wall and the pressure-resistant wall, and the treatment chamber is heated by supplying a nonreactive gas such as argon gas to the partitioned chamber as heating medium.

However, the related art as described above has the following problems to be solved.

In the apparatus of Patent Literature 1, the large thickness of the pressure-resistant wall inhibits transfer of heat from the heating medium to the treatment chamber since the inside of the pressure-resistant wall is heated or cooled from the outside of the pressure-resistant wall. This inhibits the reduction in heating time or cooling time of the pressure-resistant container.

The high-pressure treatment apparatus of Patent Literature 2 has a limitation in the reduction in volume of the partitioned chamber since a heater for heating the heating medium is provided within the partitioned chamber. This leads to increase in overall size and complication of the high-pressure treatment apparatus.

Related Art Documents

[Patent Literatures]
Patent Literature 1: Japanese Patent Application Laid-Open No. 2007-309626
Patent Literature 2: Japanese Patent Application Laid-Open No. 7-268635

SUMMARY OF THE INVENTION

From the viewpoint of the above-mentioned problems, the present invention is made and has an object to provide a high-pressure treatment apparatus, capable of efficiently performing adjustment of pressure or temperature of a treatment chamber in a short time without significant increase in overall size or complication of the apparatus.

To attain the purpose, a high-pressure treatment apparatus according to the present invention includes: a pressure-resistant container having a pressure-resistant wall which surrounds the treatment chamber inside and an open end which opens the treatment chamber to the outside; a lid member installed to the pressure-resistant container to seal the treatment chamber by closing the open end of the pressure-resistant container; a supply means for supplying a process fluid to the treatment chamber; a partition wall which is provided along the inside surface of the pressure-resistant container while having a thickness smaller than that of the pressure-resistant wall to form a partitioned chamber with the inside surface, the partition wall isolating the partitioned chamber from the treatment chamber within the pressure-resistant container so as to prevent inflow of the process fluid from the treatment chamber to the partitioned chamber; and a heat transfer control means which controls transfer of heat between the treatment chamber and the partitioned chamber by heating or cooling a heating medium outside the container and feeding the resulting heating medium into the partitioned chamber.

MODE FOR CARRYING OUT THE INVENTION

A first embodiment of the present invention will be described based on the accompanying drawings. In the following description, supercritical treatment using supercritical fluid (supercritical carbon dioxide) is exemplified.

Figure 1:
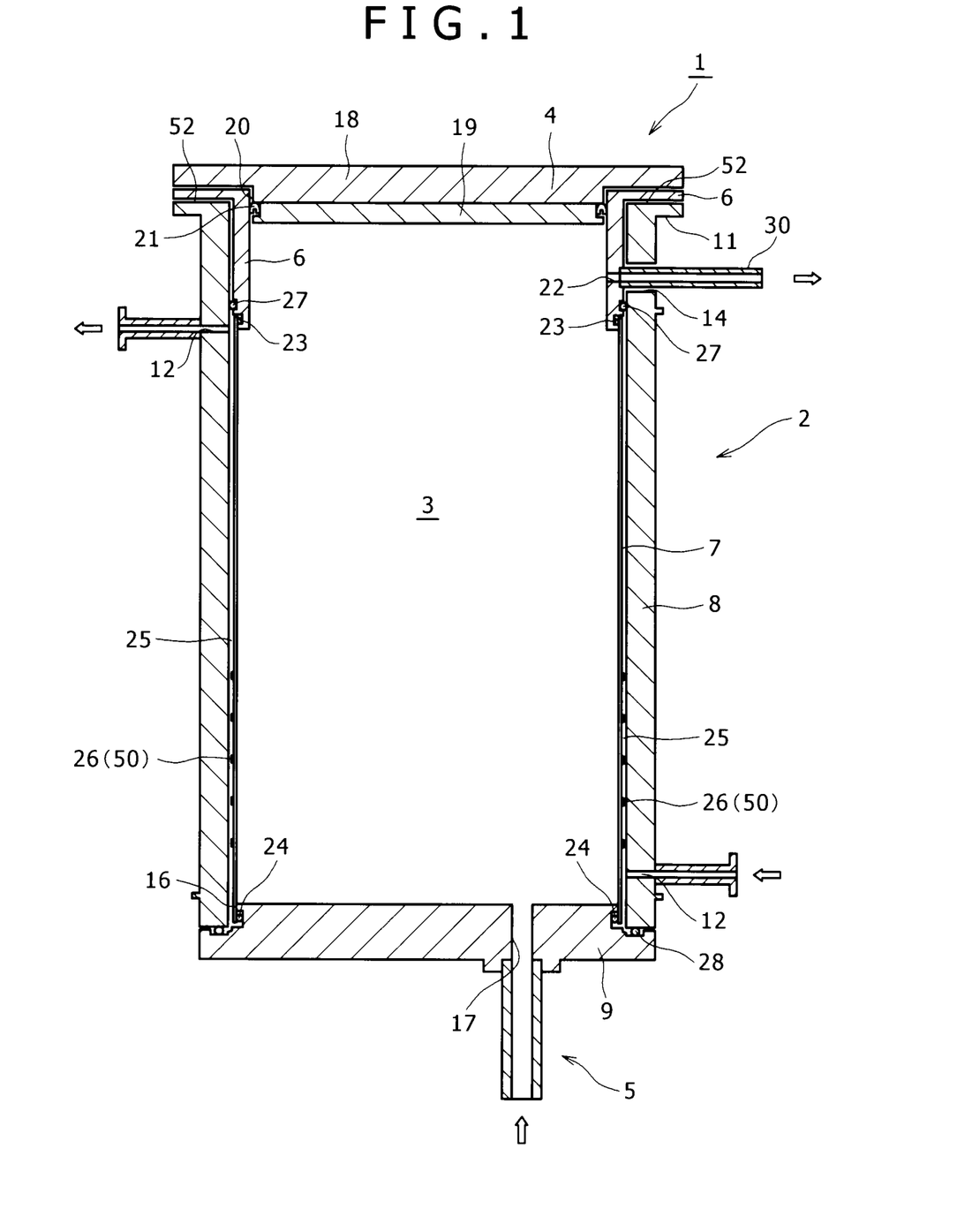
FIG. 1 is a front sectional view of a high-pressure treatment apparatus according to the present invention.
Figure 2:
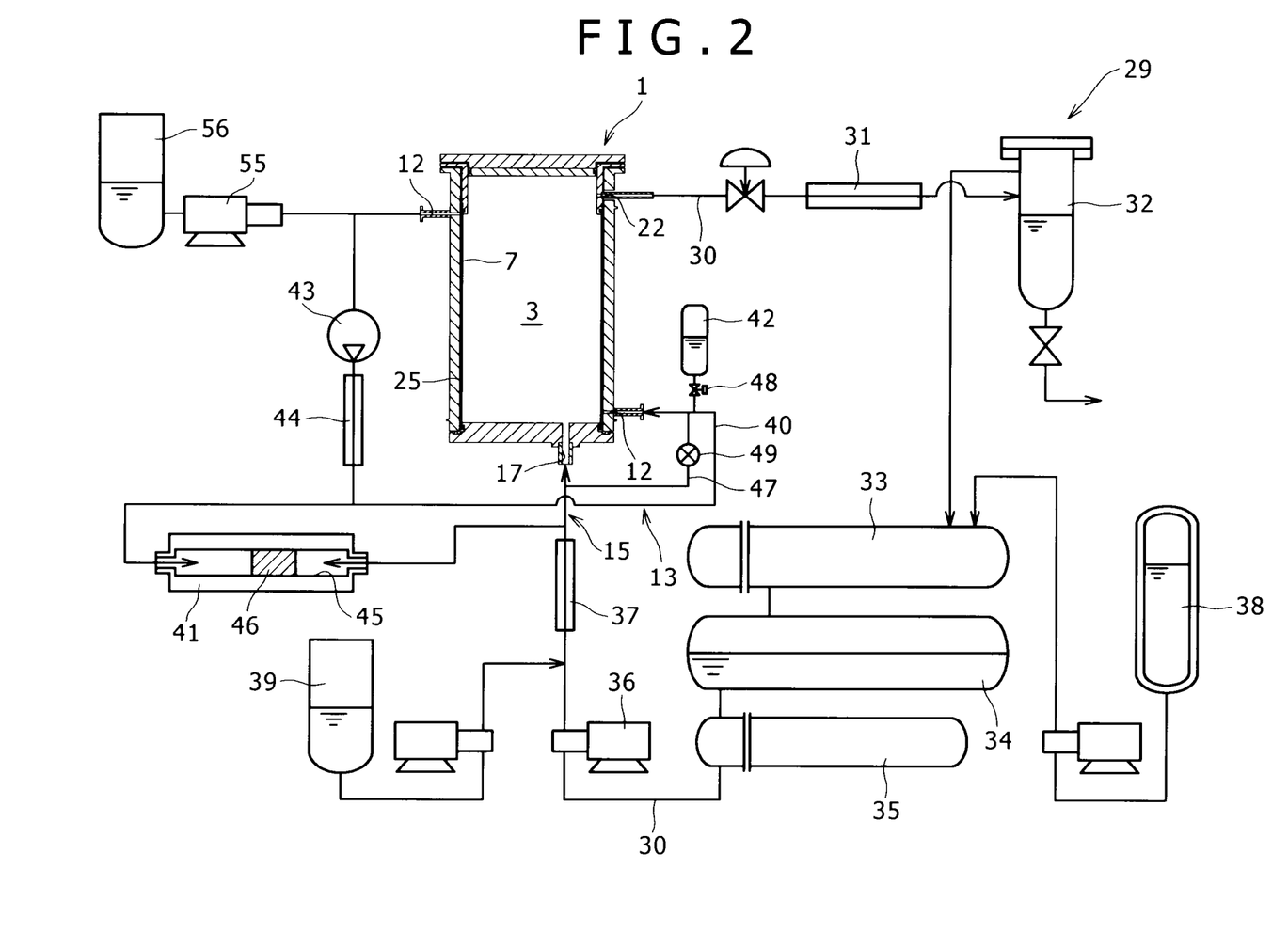
FIG. 2 is a flow sheet showing a high-pressure treatment facility provided with the high-pressure treatment apparatus.

FIGS. 1 and 2 show a high-pressure treatment apparatus 1 according to this embodiment. The high-pressure treatment apparatus 1 includes: a pressure-resistant container 2 containing a treatment chamber 3 and having an open end 52 which opens the treatment chamber 3 in a specific direction (upwardly in the drawings); a lid member 4 which seals the container (the treatment chamber 3) by being fitted to the pressure-resistant container 2 to close the open end 52; a supply means 5 for supplying a process fluid to the treatment chamber 3; a collar member 6 provided between the lid member 4 and the pressure-resistant container 2; and a partition wall 7 provided below the collar member 6. The partition wall 7 divides the inside of the pressure-resistant container 2 into the treatment chamber 3 on the inside and a partitioned chamber 25 on the outside, and isolates both the chambers 3 and 25 from each other to prevent inflow of the process fluid in the treatment chamber 3 to the partitioned chamber 25.

In this high-pressure treatment apparatus 1, dyeing, plating, water-repellent coating or the like to a treatment object in a supercritical state, or hot isostatic press treatment (HIP treatment) is performed by supplying a high-temperature, high-pressure process fluid to the treatment chamber 3.

The high-pressure treatment apparatus 1 will be illustrated while taking the vertical direction in paper surface of FIG. 1 as vertical direction, the direction receding from the center of the pressure-resistant container 2 as outer circumferential direction (radially outward direction), and the direction approaching to the center as inner circumferential direction (radially inward direction). These directions are matched to the directions in the use of the high-pressure treatment apparatus 1.

The pressure-resistant container 2 includes a container body 8 that is a pressure-resistant wall, and a bottom body 9. The container body 8 has a cylindrical shape having openings at upper and lower ends, and the bottom body 9 is installed to the lower end of the container body 8 to close the lower end opening of the container body 8. The upper end of the container body 8 corresponds to the open end 52.

The container body 8 is formed in a cylindrical shape around an axis along the vertical direction. A flange part 11 hanging to the radial outside over the other part is formed at the upper end of the container body 8. The flange part 11 has a flat upper surface, and the lid member 4 is fitted to this upper surface through the collar member 6, whereby the treatment chamber 3 is sealed.

The container body 8 includes an insert hole 12 formed in each of upper and lower parts thereof. The upper and lower insert holes 12 and 12 are provided to be located diagonally across the treatment chamber 3, and extend through the container body 8 in its thickness direction (radial direction) to allow the inside and outside of the container body 8 to communicate with each other. The supply or discharge of heating medium is performed through the upper and lower insert holes 12 and 12. In this embodiment, the heating medium is supplied into the container body 8 through the lower insert hole 12, and this heating medium is discharged out of the container body 8 through the upper insert hole 12.

The container body 8 also includes a pipe insert hole 14 which extends through the container body 8 in its radial direction similar to the insert holes 12. A fluid conduit 30 for draining the process fluid out of the container body 8 is inserted to this pipe insert hole 14.

The bottom body 9 is formed in a disk shape by a pressure-resistant material having acid resistance and pressure resistance (e.g., stainless steel). A fitting part 16 projecting upwardly beyond the circumferential part is formed in a central portion of the bottom body 9, and this fitting part 16 is fitted to the lower end of the container body 8.

A through hole 17 extending through the bottom body 9 in the vertical direction is formed in a position close to the center of the bottom body 9, and this through hole 17 is connected to a fluid passage 15 which will be described later.

Namely, in the pressure-resistant container 2 of this embodiment, the process fluid flows into the treatment chamber 3 through the through hole 17 of the bottom body 9 and discharges to the outside through a fluid discharge port 22 of the pipe insert hole 14.

The lid member 4 has a lid body 18 on the upper side and an inner lid 19 on the lower side, which are vertically superposed one over other.

The lid body 18 is formed in a disk shape by the same material as the container body 8. A fitting part 20 projecting downwardly beyond the outer circumferential part is formed in a central portion of the lid body 18, and this fitting part 20 is fitted to the upper end of the container body 8.

The inner lid 19 is formed in a disk shape by the same pressure-resistant material as the bottom body 9. The inner lid 19 includes an annular recessed part opened toward the lower surface of the lid body 18, which is formed over the whole circumference of its periphery, and a lip seal 21 is provided within the annular recessed part.

The collar member 6 is provided between the lid member 4 and the container body 8. The collar member 6 is a cylindrical body, with the periphery at the upper end thereof hanging to the radial outside over the other part in a flanged shape. The collar member 6 is attached to the container body 8 so that this hanging part in the flanged shape is held between the lid member 4 and the container body 8. The peripheral edge of the above-mentioned lip seal 21 contacts with the inner circumferential surface of the collar member 6, whereby the gap between the collar member 6 and the lid member 4 is sealed to maintain the air-tight state in the treatment chamber 3.

The collar member 6 includes the fluid discharge port 22 formed in a position corresponding to the pipe insert hole 14 of the container body 8. The fluid discharge port 22 radially extends through the collar member 6, and the process fluid in the treatment chamber 3 is discharged out of the high-pressure treatment apparatus 1 through the fluid discharge port 22.

The partition wall 7 has a vertically opened cylindrical shape. The upper part of the partition wall 7 is fitted to between the outer circumferential surface of the lower end of the collar member 6 and the inner circumferential surface of the container body 8. In response, a first seal body 23 is provided on the lower outside surface of the collar member 6, and this first seal body 23 is closely fitted to the inner circumferential surface of the upper end of the partition wall 7, whereby the air-tight state in the treatment chamber 3 is maintained. The lower part of the partition wall 7 is fitted to between the outer circumferential surface of the fitting part 16 of the bottom body 9 and the inner circumferential surface of the lower end of the container body 8. In response, a second seal body 24 is provided on the outer circumferential part of the fitting part 16, and the second seal body 24 is closely fitted to the inner circumferential surface of the lower end of the partition wall 7, whereby the air-tight state in the treatment chamber 3 is maintained.

The partition wall 7 is disposed so as to cover the whole inside surface of the container body 8 located below the collar member 6, thereby dividing the inside of the pressure-resistant container 2 into the treatment chamber 3 on the inside and the partitioned chamber 25 on the outside. The partition wall 7 is formed of a metallic material with a thickness smaller than that of the container body 8, and provided to be spaced radially inwardly from the container body 8. The partition wall 7 isolates both the chambers 3 and 25 from each other to prevent inflow of the process fluid from the treatment chamber 3 on the inside to the partitioned chamber 25 on the outside.

The supply means 5 includes a fluid passage 15 for resupplying the process fluid discharged from the treatment chamber 3 to the treatment chamber 3 after adjusting the temperature and pressure of the process fluid.

As the process fluid, although any fluid can be used in principle, a fluid excellent in diffusivity and solubility under the temperature and pressure of the critical point or more is preferably used. In this embodiment, supercritical carbon dioxide is used as the process fluid.

The fluid passage 15 includes the fluid conduit 30 for distributing the process fluid (supercritical carbon dioxide) from the fluid discharge port 22 to the through hole 17, and an evaporator 31, a separator 32, a condenser 33, a liquefaction tank 34, a cooler 35, a fluid pump 36, and a heater 37 are provided on the course of the fluid conduit 30.

In the fluid passage 15, supercritical carbon dioxide discharged from the treatment chamber 3 is decompressed in the evaporator 31 to gasify the liquefied fluid. The thus-vaporized carbon dioxide is separated from impurities such as water mixed thereto in the separator 32, and only the gas of carbon dioxide is recovered. The recovered gas of carbon dioxide is sent to the condenser 33, liquefied by cooling in the condenser 33, and stored in the liquefaction tank 34.

Although carbon dioxide is released when taking out a treatment object in the high-pressure treatment apparatus 1, the carbon dioxide in the storage tank 38 is supplied as occasion demands.

The high-pressure carbon dioxide in the liquefaction tank 34 is sent to the cooler 35, and overcooled in the cooler 35. The carbon dioxide thus-liquefied is then sent to the treatment chamber 3 by the fluid pump 36. If dye, functionalizing agent, water or the like is needed for treatment within the treatment chamber 3, the dye, functionalizing agent, water or the like can be supplied from an entrainer tank 39 by an entrainer pump and mixed to the liquefied carbon dioxide.

The liquefied carbon dioxide is sent to the heater 37 provided between the fluid pump 36 and the treatment chamber 3. In the heater 37, the liquefied carbon dioxide is heated to a temperature of the critical point or higher and changed to supercritical carbon dioxide, and this supercritical carbon dioxide is supplied to the treatment chamber 3.

The high-pressure treatment apparatus 1 includes not only the supply means 5 for supplying the process fluid set to a desired temperature into the treatment chamber 3 but also a heating medium passage 13 for supplying or filling the heating medium adjusted to a desired temperature also to the partitioned chamber 25 provided outside the treatment chamber 3 through the partition wall 7. The high-pressure treatment apparatus 1 includes the heat transfer control means which controls the transfer of heat between the treatment chamber 3 and the partitioned chamber 25 by feeding the heating medium to the partitioned chamber 25, and the heat transfer control means includes the heating medium passage 13 for supplying the temperature-set heating medium to the partitioned chamber 25.

The partitioned chamber 25 is a cylindrical space formed between the radial outside of the partition wall 7 and the container body 8, and can store the heating medium. The partitioned chamber 25 communicates with the lower insert hole 12 for supplying the heating medium from the heating medium passage 13 into the partitioned chamber 25 and the upper insert hole 12 for discharging the heating medium in the partitioned chamber 25 to the heating medium passage 13, and the upper and lower insert holes 12 and 12 are connected to each other through the heating medium passage 13.

The partitioned chamber 25 includes a convection control means 26 for suppressing convection of heating medium within the partitioned chamber 25, and a heating medium distribution promoting means (not shown) for spreading the heating medium over the whole surface of the partition wall 7.

The convection control means 26 is a structure for suppressing the convection of heating medium within the partitioned chamber 25, which is disposed within the partitioned chamber 25. Examples of the convection control means 26 include a multilayer structure (e.g., honeycomb structure) including a plurality of plate bodies made of metal, quartz, ceramics or the like, which is aligned at vertical intervals, and a porous structure (e.g., glass wool) formed of the above-mentioned materials. Such a convection control means 26 regulates the vertical movement of the heating medium within the partitioned chamber 25 by being provided within the partitioned chamber 25, and consequently suppresses the convection of heating medium within the partitioned chamber 25, whereby the loss of heat from the treatment chamber resulting from the convection of medium can be reduced. Namely, the transfer of heat between the treatment chamber and the partitioned chamber can be suppressed.

The heating medium distribution promoting means is provided on at least one surface of the inner circumferential surface of the container body 8 and the outer surface of the partition wall 7 in the pressure-resistant container 2 so that the heating medium can be spread over the whole surface of the partition wall 7. The heating medium distribution promoting means is formed in a plate-like shape so as to project toward the radial inside from the inner circumferential surface of the container body 8 or toward the radial outside from the outer surface of the partition wall 7, and guides the flow of medium within the partitioned chamber 25 so that the heating medium is spread over the whole surface of the partition wall 7. As other examples of the heating medium distribution promoting means, the heating medium distribution promoting means may be composed of a rib continuously formed on the outer circumferential surface of the partition wall 7 in a vertically spiral shape to guide the heating medium fed through the lower insert hole 12 to the upper insert hole 12, or composed of plate materials formed in a ring shape partially cut in the circumferential direction (substantially C-shape), which are stacked at vertical intervals with the cut parts being alternated.

The heating medium distribution promoting means as described above can prevent significant deformation of the partition wall 7, for example, even in a case such that the partition wall 7 swells toward the radial outside due to the pressure of the partitioned chamber 25 lower than that of the treatment chamber 3.

The heating medium passage 13 includes a heating medium conduit 40 for distributing the heating medium from the upper insert hole 12 to the lower insert hole 12, as shown in FIG. 2, and a compression means 43, a heat exchanger 44, a pressure equalizing conductor 41, an accumulator 42, a heating medium pump 55 and a heating medium tank 56 are provided on the course of the heating medium conduit 40.

In the heating medium passage 13, heating medium discharged from the partitioned chamber 25 through the upper insert hole 12 is sent to the compression means 43. The compression means 43 is a compressor or pump capable of adjusting the pressure of the discharged heating medium, and the heating medium whose pressure is adjusted by the compression means 43 is sent to the heat exchanger 44 (temperature adjustment means). The heat exchanger 44 heats or cools the heating medium to a predetermined temperature. The heating medium whose temperature is adjusted by the heat exchanger 44 is then resupplied to the partitioned chamber 25. The heating medium passage 13 includes a heating medium tank 56 which receives and stores the heating medium discharged out of the partitioned chamber 25 through the upper insert hole 12 via a conduit not shown, and a heating medium pump 55 for feeding the heating medium from the heating medium tank 56 to the heating medium passage 13.

The heat transfer control means is configured to control transfer of heat between the treatment chamber 3 and the partitioned chamber 25 by feeding heating medium into the partitioned chamber 25 with heating or cooling the heating medium to an appropriate temperature, or constituted by heating medium preliminarily filled in the partitioned chamber 25. The heat transfer control means in this embodiment includes a first heat transfer control means and a second heat transfer control means respectively according to the case of heating or cooling the treatment chamber 3 and the case of thermally insulating the treatment chamber 3 as described below.

The first heat transfer control means, which is used to heat or cool the treatment chamber 3, is composed of the heat exchanger 44 in the heating medium passage 13 and the heating medium conduit 40 passing through the heat exchanger 44. The first heat transfer control means promotes the transfer of heat between the partitioned chamber 25 and the treatment chamber 3 through the partition wall 7 by heating or cooling the heating medium discharged out of the partitioned chamber 25 to a predetermined temperature by use of the heat exchanger 44 (temperature adjustment means), and supplying the thus-adjusted high-temperature or low-temperature heating medium from the treatment chamber 3 to the partitioned chamber 25. The heating medium is heated by the heat exchanger 44 when heating the treatment chamber 3, and cooled when cooling it.

The heating medium whose temperature is adjusted to higher or lower in temperature than the treatment chamber 3 or the externally temperature-set heating medium is not limited to those actually subjected to heating treatment or cooling treatment. This heating medium may be a fluid, e.g., tap water, having a substantially constant temperature without heating or cooling, the temperature being lower than that of the process fluid within the treatment chamber 3.

The second heat transfer control means, which is used to minimize, when the treatment temperature of the treatment chamber 3 is changed, the effect of this temperature change on the temperature of the container body 8, is composed of a heating medium having heat insulating property. This heating medium may be preliminarily stored in the heating medium tank 56 provided in the heating medium passage 13 and supplied to the partitioned chamber 25 through the heating medium passage 13 by the heating medium pump 55 or compressor provided in the heating medium passage 13, or may be preliminarily filled in the partitioned chamber 25. This heating medium causes the partitioned chamber 25 to function as heat-insulating layer.

As the heating medium having heat insulating property, for example, a gas or liquid having thermal conductivity of 0.2 W/mK or less, preferably 0.1 W/mK or less can be used. Concretely, supercritical carbon dioxide (0.075 W/mK at 20 MPa, 340° K), nitrogen (0.033 W/mK at the same), argon (0.024 W/mK at the same) or the like as compressible gas, and alkyldiphenyl (0.14 W/mK at 60° K), fluorine-based heating medium GALDEN HT (0.063 W/mK at 60° K) or the like as liquid are preferably used.

Such a heating medium having heat insulating property can reduce the rate of heat transfer between the partitioned chamber 25 and the treatment chamber 3 through the partition wall 7 to suppress a sudden temperature change of the treatment chamber 3 by being supplied to the partitioned chamber 25, and also can suppress the transfer of heat between the partitioned chamber 25 and the treatment chamber 3 through the partition wall 7 to thermally insulate the treatment chamber 3 by being preliminarily filled in the partitioned chamber 25.

The temperature of the above-mentioned heating medium can be set to the same temperature as the process fluid in the treatment chamber 3. This further enhances the effect of suppressing the transfer of heat (heat exchange) between the partitioned chamber 25 and the treatment chamber 3 through the partition wall 7.

The heating/cooling or decompression of the partitioned chamber 25 by the heat transfer control means causes a pressure difference between the partitioned chamber 25 and the treatment chamber 3, and this pressure difference causes plastic deformation of the partition wall 7 and brings it into breakage. Therefore, the high-pressure treatment apparatus 1 of the present invention includes a partition wall protection means which prevents the partition wall 7 from being deformed by a pressure difference caused between the treatment chamber 3 and the partitioned chamber 25 due to a temperature difference caused by the heat transfer control means.

The high-pressure treatment apparatus 1 of this embodiment includes, as the partition wall protection means, use of elastic deformation of the partition wall 7 and a pressure control means for reducing the above-mentioned pressure difference.

With respect to the use of elastic deformation of the partition wall 7, the partition wall 7 is formed of a material easy to elastically deform. When the partitioned chamber 25 becomes higher in pressure than the treatment chamber 3, the partition wall 7 elastically deforms to swell toward the treatment chamber 3 to thereby increase the volume of the partitioned chamber 25 just by the amount of this elastic deformation, whereby the partitioned chamber 25 and the treatment chamber 3 are equalized in pressure. When the treatment chamber 3 becomes higher in pressure than the partitioned chamber 25, reversely, the partition wall 7 elastically deforms to recess toward the partitioned chamber 25 to thereby decrease the volume of the partitioned chamber 25 just by the amount of this elastic deformation, whereby the partitioned chamber 25 and the treatment chamber 3 are equalized in pressure. To form the partitioned wall 7 by use of the material easy to elastic deform provides the effect of further suppressing the plastic deformation of the partitioned wall 7 itself, in addition to rapid pressure equalization between the partitioned chamber 25 and the treatment chamber 3 by use of the elastic deformation.

The above-mentioned pressure control means includes the following first to fourth pressure control means.

The first pressure control means is mainly composed of the pressure equalizing conductor 41. The pressure equalizing conductor 41 includes a conduction pipe (pressure pipe) 45, and a movable body 46 freely moving within the conduction pipe 45. One end of the conduction pipe 45 communicates with the heating medium conduit 40, and the other end communicates with the middle between the heater 37 and the high-pressure treatment apparatus 1 in the fluid conduit 30. The movable body 46 is provided within the conduction pipe 45 so that it can move within the conduction pipe 45 while dividing the inside of the conduction pipe 45 into a chamber on the heating medium conduit 40 side (the partitioned chamber 25 side) and a chamber on the fluid passage 15 side (the treatment chamber 3 side), and sealing the conduction pipe 45 to arrest leak of the heating medium on the heating medium conduit 40 side (the partitioned chamber 25 side) to the fluid passage 15 and leak of the process fluid on the fluid passage 15 side (the treatment chamber 3 side) to the heating medium passage 13.

For example, when the partitioned chamber 25 becomes higher in pressure than the treatment chamber 3, the pressure of the heating medium in the heating medium pipe 40 is increased more than that of the process fluid in the fluid conduit 30, and this pressure difference causes the movable body 46 to move toward the fluid conduit 30 within the conduction pipe 45 to increase the pressure on the treatment chamber 3 side just by the amount of the movement, whereby the partitioned chamber 25 and the treatment chamber 3 are equalized in pressure. When the partitioned chamber 25 becomes lower in pressure than the treatment chamber 3, a pressure difference reverse to the above causes the movable body 46 to move toward the heating medium conduit 40 within the conduction pipe 45 to reduce the pressure on the treatment chamber 3 side just by the amount of the movement, whereby the partitioned chamber 25 and the treatment chamber 3 are equalized in pressure.

In the first pressure control means, since the movable body 46 immediately reacts to the pressure difference caused between the partitioned chamber 25 and the treatment chamber 3, even in the event of a sudden pressure difference between the partitioned chamber 25 and the treatment chamber 3, the pressure equalization between the partitioned chamber 25 and the treatment chamber 3 can be rapidly performed in response to the pressure difference to protect the partition wall 7 from deformation.

The second pressure control means is configured to resolve the pressure difference between the heating medium conduit 40 and the fluid conduit 30 by moving a part of the heating medium or process fluid between the both, and includes a pipe 47 provided between the heating medium conduit 40 and the fluid conduit 30 to directly connect the both. The pipe 47 includes an on-off valve 49 that is an opening and closing part switchable to an open state to open the pipe and to a close state to close the pipe. The on-off valve 49 can be opened, for example, only when the pressure difference between the partitioned chamber 25 and the treatment chamber 3 is increased such that its reduction is needed. Consequently, the heating medium or process fluid is partially moved from the high-pressure side to the low-pressure side through the pipe 47 to equalize the pressures of the partitioned chamber 25 and the treatment chamber 3. Further, it is also possible to attain automatic control for pressure equalization by providing respective pressure detectors of the partitioned chamber 25 and the treatment chamber 3, and a controller which opens the on-off valve when the difference between detection values of these pressure detectors exceeds a predetermined value.

With respect to the second pressure control means, a form without the on-off valve 49 is also considered. For example, in a form shown in FIG. 2, since a pipe on the upstream side of the treatment chamber 3 in the pressure-resistant container 1, or a pipe for supplying process fluid to the treatment chamber 3 communicates with a pipe for supplying heating medium to the partitioned chamber 25, the process fluid in the treatment chamber 3 never flows into the partitioned chamber 25 even if the pipe 47 is regularly opened by the omission of the on-off valve 49. Since the process fluid flowing into the treatment chamber 3 is free from impurities by being passed through the separator 32, the problem of inclusion of impurities to the partitioned chamber 25 is never caused even if the fluid flows into the partitioned chamber 25.

To maintain the heat control performance using the heating medium at high level, it is preferred to perform the opening and closing by the on-off valve 49. When further sure avoidance of mixing of the heating medium with the process fluid is needed, only discharge of a part of the high-pressure side fluid (heating medium or process fluid) can be performed.

The second pressure control means can be suitably used, for example, when the heating medium and the process fluid have the same or extremely similar properties, and can be mixed.

The third pressure control means is mainly composed of the compression means 43. The compression means 43 equalizes the pressures of the treatment chamber 3 and the partitioned chamber 25 by raising the pressure in the partitioned chamber 25 while raising the pressure in the treatment chamber 3 by use of the fluid pump 36. The adjustment of pressure is performed by use of a pressure gauge not shown.

The fourth pressure control means is mainly composed of the accumulator 42. The accumulator 42 is a container formed so as to communicate with the heating medium conduit 40 and to be capable of storing high-pressure heating medium. An openable and closable valve 48 is provided between the container constituting the accumulator 42 and the heating medium conduit 40, and the high-pressure heating medium in the container can be sent to the partitioned chamber 25 through the heating medium conduit 40 by opening the valve 48. Consequently, when the treatment chamber 3 becomes higher in pressure than the partitioned chamber 25, the valve 48 is opened to send the high-pressure heating medium in the container to the partitioned chamber 25 through the heating medium conduit 40, whereby the partitioned chamber 25 and the treatment chamber 3 can be equalized in pressure.

The valve 48 can be omitted. For example, a shrinkable partition wall of rubber or the like is provided within the accumulator 42, and the partition wall of rubber or the like swells upward within the accumulator 42, when the treatment chamber 3 becomes higher in pressure than the partitioned chamber 25, to compress the high-pressure gas on the upper side, whereby the pressure equalization can be also attained.

EXAMPLE 1

The present invention will be described further in detail in reference to examples.

In Example 1, the high-pressure treatment apparatus 1 was used to form a water-repellent coat layer on a surface of a treatment object of hydrocarbon resin in the presence of supercritical carbon dioxide.

In the formation of the water-repellent coat layer, the treatment object and a coating agent were prepared according to the following procedures. The treatment object is a resin piece of a predetermined size formed of hydrocarbon resin (polyimide resin). The coating agent contains a raw material monomer of the water-repellent coat layer and a polymerization initiator. The raw material monomer is a mixture of a fluorine monomer (3,3,4,4,5,5,6,6,7,7,8,8,9,9,10,10,10-heptadecafluorooctyl ethyl methacrylate) and a hydrocarbon monomer (n-stearyl acrylate), and the coating agent was prepared by mixing the raw material monomer and the polymerization initiator (azobisisobutyronitrile) so that the both have the same parts by weight.

Water-repellent coating was performed by use of the thus-prepared treatment object and coating agent. To perform the water-repellent coating in the high-pressure treatment apparatus 1, a container body 8 of 100 mm in thickness was used, and a partition wall 7 of 5 mm in thickness was disposed along the inside surface thereof.

The operation is performed as follows. Hot water of 55° C. is supplied to the partitioned chamber 25 through the heating medium passage 13, and the treatment chamber 3 is adjusted to the temperature of 50° C. by causing transfer of heat between the partitioned chamber 25 and the treatment chamber 3 through the partition wall 7 by use of the first heat transfer control means. In this case, a pressure of about 0.1 MPa is applied to the heating medium since the treatment chamber 3 is opened to the atmosphere.

After the treatment chamber 3 is sufficiently raised in temperature, the treatment object and the coating agent are put into the treatment chamber 3, and the treatment chamber 3 is sealed by the lid member 4. The fluid pump 36 feeds compressed $CO_2$ from the storage tank 38 to the treatment chamber 3 through the fluid conduit 30. The supply of $CO_2$ is continued until the inside of the treatment chamber 3 reaches 15 MPa. At that time, the pressures in the treatment chamber 3 and the partitioned chamber 25 can be raised while preventing the plastic deformation of the partition wall 7 and equalizing the internal pressure of the partitioned chamber 25 with the internal pressure of the treatment chamber 3 by use of the elastic deformation of the partition wall 7 and the first to fourth pressure control means.

After the lapse of a fixed time (about 120 minutes) after the treatment chamber 3 reaches 50° C. and 15 MPa, hot water of 85° C. is supplied into the partitioned chamber 25 through the heating medium passage 13, and transfer of heat between the partitioned chamber 25 and the treatment chamber 3 through the partition wall 7 is performed using the first heat transfer control means, whereby the temperature of the process fluid in the treatment chamber 3 is raised to 80° C. The polymerization initiator in the coating agent is decomposed by raising the temperature of the treatment chamber 3 from 50° C. to 80° C., and copolymerization of the fluorine monomer and the hydrocarbon monomer proceeds.

Next, in the high-pressure treatment apparatus 1, the efficiency of heat transfer from the heating medium in the partitioned chamber 25 to the process fluid in the treatment chamber 3 was computationally determined.

Figure 3:
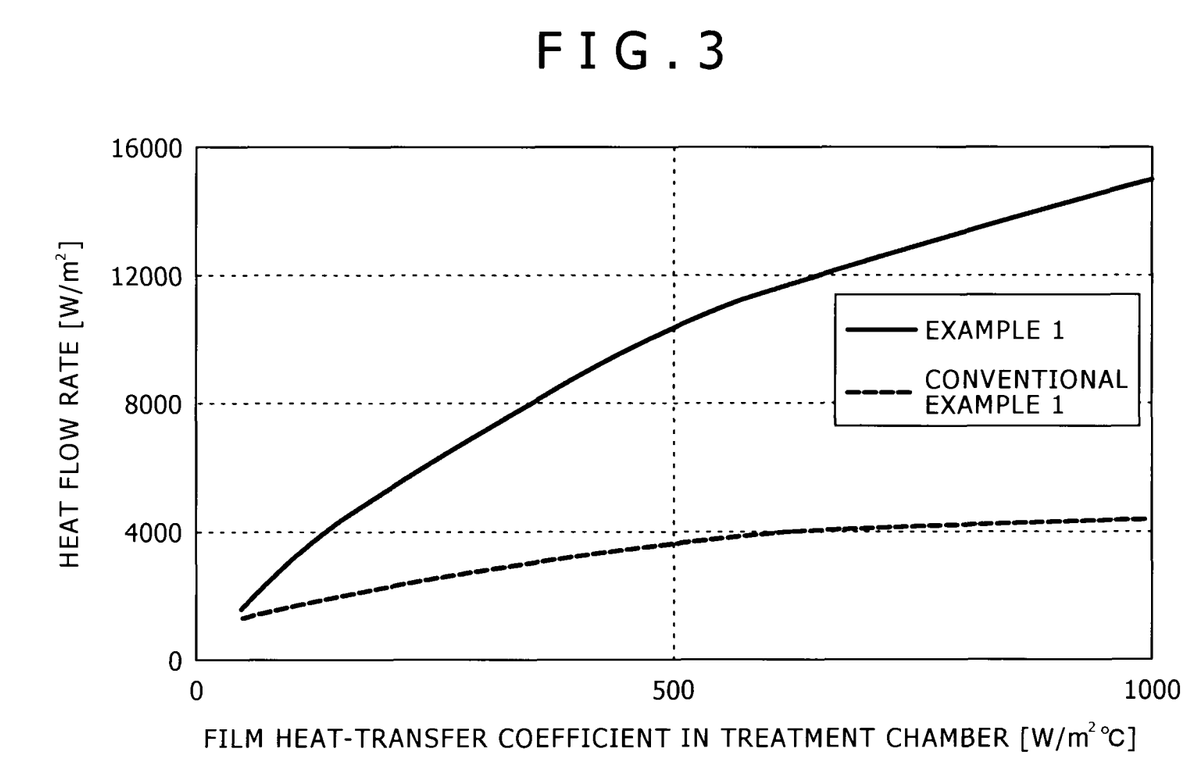
FIG. 3 is a graph showing variations of heat flow rate relative to film heat-transfer coefficient.

FIG. 3 shows the results of determination of heat flow rate at a temperature difference of 35° C. transferring from the partitioned chamber 25 to the treatment chamber 3, relative to film heat-transfer coefficients in a natural convection state to a forced convection state of the treatment chamber 3. The heat flow rate was calculated with preconditions of film heat-transfer coefficient on the heating medium side of 1000 W/m²° C., and heat conductivity of the container body 8 and the partition wall 7 of 16.2 W/m° C.

In FIG. 3, the high-pressure treatment apparatus 1 including the container body 8 and the partition wall 7 provided on the inside thereof is used in Example 1, and a high-pressure treatment apparatus including the partition wall 7 provided outside the container body 8 is used in Conventional Example 1.

FIG. 3 shows that the heat flow rate transferring to the treatment chamber 3 is larger in Example 1 than in Conventional Example 1 irrespective of the natural convection state or forced convection state in the treatment chamber 3, and the high-pressure treatment apparatus 1 of Example 1 using both the heat transfer control means and the partition wall protection means can more efficiently transfer heat. Particularly, the heat flow rate in Example 1 tends to remarkably increase as the treatment chamber 3 gets close to the forced convection state, compared with Conventional Example 1, although the heat flow rate in Example 1 is slightly larger than in Conventional Example 1 when the treatment chamber 3 is in a state close to the natural convection state (when the film heat-transfer coefficient is low), and this shows that the heat efficiency is remarkably improved in the high-pressure treatment apparatus 1 of the present invention as the process fluid is supplied more to the treatment chamber 3 through the fluid passage 15.

EXAMPLE 2

The high-pressure treatment apparatus 1 of Example 2 will be then described. In the high-pressure treatment apparatus 1 of Example 2, the treatment chamber 3 is cooled after performing HIP treatment to a treatment object at high temperature and high pressure in the treatment chamber 3.

The high-pressure treatment apparatus 1 of Example 2 includes a pressure-resistant container 2 having an inside diameter of 1500 mm, and a partition wall 7 of 20 mm in thickness provided in the inner part of the pressure-resistant container 2. The treatment chamber 3 is formed inside the partition wall 7, and process fluid of 150° C. is stored in the treatment chamber 3.

In the high-pressure treatment apparatus 1 of Example 2, the partitioned chamber 25 is formed outside the partition wall 7. A heating medium (cooling water) of water temperature 35° C. is distributed to the partitioned chamber 25, and the partitioned chamber 25 includes the first heat transfer control means.

In the high-pressure treatment apparatus 1 of Example 2, the heat passage coefficient in transfer of heat from the heating medium in the partitioned chamber 25 to the process fluid in the treatment chamber 3 was computationally determined. The high-pressure treatment apparatus 1 of Example 2 in the following calculation includes a container body 8 and the partition wall 7 provided inside it, and the high-pressure treatment apparatus of Conventional Example 2 includes a container body 8 having an outside diameter of 2000 mm and an inside diameter of 1500 mm, and a partition wall 7 provided outside it.

The heat passage coefficient K in the high-pressure treatment apparatus 1 of Conventional Example 2 can be given by the following expression (1), when the radius r2 of outer diameter of the pressure-resistant container 2 is 1 m, the radius r1 of inside diameter of the pressure-resistant container 2 is 0.75 m, each of the heat-transfer coefficient h1 of process fluid and the heat-transfer coefficient h2 of heating medium is 400 W/m²K, and the heat conductivity λ of the container body 8 is 37.3 W/mK.

[Mathematical Expression 1]

$$\frac{1}{K} = \frac{1}{h_1 r_1} + \frac{\ln(r_2/r_1)}{\lambda} + \frac{1}{h_2 r_2} \quad (1)$$
$$= \frac{1}{400 \times 0.75} + \frac{\ln(1/0.75)}{37.3} + \frac{1}{400 \times 1}$$
$$= 13.54 \times 10^{-3}$$

$$\therefore K = 73.9 \text{ [W/mK]}$$

On the other hand, when the heat passage coefficient K determined by the expression (1) is used, the heat quantity q transferring from the treatment chamber 3 to the partitioned chamber 25 through the container body 8 per 1 m of the pressure-resistant container is as shown in the following expression (2), wherein the temperature of process fluid is $T_{1f}$ (K), and the temperature of heating medium is $T_{2f}$ (K).

[Mathematical Expression 2]

$$q = 2\pi K(T_{1f} - T_{2f}) = 53.4 \text{ [kW/m]} \quad (2)$$

The high-pressure treatment apparatus 1 of Example 2 will be then described. The difference of the high-pressure treatment apparatus of Conventional Example 2 from Example 2 is that the partition wall 7 is provided outside the container body 8 in Conventional Example 2, while the partition wall 7 is provided inside the container body 8 in Example 2. Detailed description for Conventional Example 2 is omitted since points other than the above-mentioned point are the same as Example 2.

The heat passage coefficient in the high-pressure treatment apparatus 1 of Conventional Example 2 can be given by the following expression (3) similar to the case of Example 2.

[Mathematical Expression 3]

$$\frac{1}{K} = \frac{1}{h_1 r_1} + \frac{\ln(r_2/r_1)}{\lambda} + \frac{1}{h_2 r_2} \quad (3)$$

$$= \frac{1}{400 \times 0.75} + \frac{\ln(0.77/0.75)}{37.3} + \frac{1}{400 \times 0.77}$$

$$= 7.29 \times 10^{-3}$$

$$\therefore K = 137 \text{ [W/mK]}$$

On the other hand, when the heat passage coefficient determined by the expression (3) is used, the heat quantity transferring from the treatment chamber 3 to the partitioned chamber 25 through the partition chamber 7 per 1 m of the pressure-resistant container is as shown in the following expression (4).

[Mathematical Expression 4]

$$q = 2\pi K(T_{1f} - T_{2f}) = 99 \text{ [kW/m]} \quad (4)$$

The results of the above-mentioned expressions (2) and (4) show that when the high-pressure treatment apparatus 1 of Example 2 is used, the heat quantity transferring from the treatment chamber 3 to the partitioned chamber 25 through the partition wall 7 is about 1.9 times the case of Conventional Example 2. Therefore, the high-pressure treatment apparatus 1 of the present invention can be determined to be capable of efficiently cooling or heating process fluid within the treatment chamber 3, even in use for HIP treatment, by using both the heat transfer control means and the partition wall protection means.

The present invention is never limited to each of the above-mentioned embodiments, and the shape, structure, material, combination, etc. of each member can be appropriately changed without departing from the gist of the present invention.

In the above-mentioned embodiments, the partition wall protection means can suppress, in addition to the deformation of the partition wall 7 due to a pressure difference caused between the treatment chamber 3 and the partitioned chamber 25 resulting from a temperature difference caused by the heat transfer control means, the deformation of the partition wall 7 due to a pressure difference caused between the treatment chamber 3 and the partitioned chamber 25 resulting from a factor other than the temperature difference caused by the heat transfer control means.

The use application of the high-pressure treatment apparatus according to the present invention is never limited to the dyeing, plating or water-repellent coating in supercritical fluid, or HIP treatment as described above. For example, the high-pressure treatment apparatus can be applied also to washing in supercritical fluid, HIP needing high-temperature, high-pressure atmosphere, and uses other than supercritical treatment.

With respect to the first to third heat transfer control means and the first to fourth pressure control means according to the above-mentioned embodiments, any one of them may be provided, or a plurality of means may be provided in a composite manner.

As described so far, the present invention provides a high-pressure treatment apparatus, capable of efficiently performing adjustment of pressure or temperature of a treatment chamber for a short time without remarkable increase in overall size or complication of the apparatus. This high-pressure treatment apparatus includes: a pressure-resistant container having a pressure-resistant wall which surrounds the treatment chamber inside and an open end which opens the treatment chamber to the outside; a lid member installed to the pressure-resistant container to seal the treatment chamber by closing the open end of the pressure-resistant container; a supply means for supplying a process fluid to the treatment chamber; a partition wall provided along the inside surface of the pressure-resistant container while having a thickness smaller than that of the pressure-resistant wall to form a partitioned chamber with the inside surface, the partition wall isolating the partitioned chamber from the treatment chamber so as to prevent inflow of the process fluid from the treatment chamber to the partitioned chamber; and a heat transfer control means which controls transfer of heat between the treatment chamber and the partitioned chamber by heating or cooling a heating medium outside the container and feeding the resulting heating medium into the partitioned chamber.

According to this apparatus, since the partition wall smaller in thickness than the pressure-resistant wall is provided inside the pressure-resistance wall of the pressure-resistant container, and the heating medium temperature-adjusted by the heat transfer control means is fed into the partitioned chamber formed between the partition wall and the pressure-resistant wall, the smaller thickness of the partition wall promotes the transfer of heat between the heating medium within the partitioned chamber and the fluid in the treatment chamber, and this assists to reduce the heating time or cooling time within the pressure-resistant container. Namely, the heat transfer control means can efficiently change the pressure or temperature of the treatment chamber in a short time or maintain its temperature by adjusting the temperature of the heating medium fed to the partitioned chamber from the outside, and various high-pressure treatments can be thus performed in a short cycle time. Since it is not necessary to provide a temperature adjustment device such as a heater in the partitioned chamber between the partition wall and the inside wall of the pressure-resistant container, the treatment chamber on the inside of the partition wall can be relatively increased in size to ensure a large treatment space for a treatment object. On the other hand, the volume of the partitioned chamber can be reduced to adjust the temperature of the partitioned chamber in a short time.

The heat transfer control means can heat the inside of the treatment chamber by, for example, feeding the heating medium into the partitioned chamber while adjusting its temperature to be higher than that of the process fluid to transfer heat from the partitioned chamber to the treatment chamber through the partition wall. It can also cool the inside of the treatment chamber by feeding the heating medium into the partitioned chamber while adjusting its temperature to be lower than that of the process fluid to reversely transfer the heat from the treatment chamber to the partitioned chamber through the partition wall. Further, the heat transfer control means can thermally insulate the inside of the treatment chamber by feeding the heating medium into the partitioned chamber while adjusting its temperature to be equal to that of the process fluid in the treatment chamber to suppress the transfer of heat between the treatment chamber and the partitioned chamber.

The heat transfer control means can suppress the transfer of heat between the treatment chamber and the partitioned chamber to thermally insulate the treatment chamber or gently change the temperature of the treatment chamber also by feeding, as the heating medium, a fluid having heat insulating property into the partitioned chamber.

Further, a convection suppressing means for suppressing convection of the heating medium within the partitioned chamber is preferably provided in the partitioned chamber. The convention suppressing means can suppress the transfer of heat between the treatment chamber and the partitioned chamber resulting from the convection of heating medium within the partitioned chamber by suppressing this convection of heating medium.

The apparatus according to the present invention more preferably includes a heating medium distribution promoting means provided on at least one surface of the inside surface of the pressure-resistant container and the outer surface of the partition wall to spread the heating medium over the whole surface of the partition wall. The heating medium distribution promoting means allows temperature control for equalizing the temperature within the treatment chamber by spreading the heating medium over the whole surface of the partition wall.

In the high-pressure treatment apparatus according to the present invention, if a difference between the pressure in the treatment chamber and the pressure in the partitioned chamber is extended due to fluctuation of pressure in the treatment chamber, temperature change in the partitioned chamber or the like, a bending load corresponding to the pressure difference acts on the partition wall. The partition wall may plastically deform upon action of a large load thereon, since the partition wall is formed thinly for the purpose of promoting the heat exchange as described above.

However, the high-pressure treatment apparatus according to the present invention can effectively suppress the deformation of the partition wall resulting from a pressure difference between the partitioned chamber and the treatment chamber by further including a pressure control means for controlling the pressure in the partitioned chamber and the pressure in the treatment chamber so as to suppress occurrence of the above-mentioned pressure difference.

Concretely, it is preferable that the pressure control means includes a pressure pipe having one end communicating with the partitioned chamber and the other end communicating with the treatment chamber; and a movable body provided within the pressure chamber so that it can move within the pressure pipe while dividing the inside of the pressure pipe into a chamber on the partitioned chamber side and a chamber on the treatment chamber side and sealing the inside of the pressure pipe to arrest the distribution of the heating medium and the process fluid between the chamber on the partitioned chamber side and the chamber on the treatment chamber side, and that the movable body moves toward the low-pressure side in the event of the pressure difference, whereby the pressure difference is reduced. This type of pressure control means can automatically reduce the difference between the pressure in the partitioned chamber and the pressure in the treatment chamber by a simple structure such that only the movable body is provided within the pressure pipe.

In the pressure control means, it is also effective to include a pipe provided between the partitioned chamber and the treatment chamber so that the both communicate with each other, and an on-off valve switchable to a state for opening the pipe and a state for closing the pipe. This type of pressure control means can isolate the partitioned chamber from the treatment chamber, for example, by closing the on-off valve to close the pipe when the pressure difference is less than a fixed value, and also can rapidly reduce the pressure difference, for example, by opening the on-off valve to open the pipe only when the pressure difference is equal to or larger than the fixed value. Further, automatic control for reducing the pressure difference can be also attained by providing pressure detectors for detecting the pressure in the partitioned chamber and the pressure in the treatment chamber respectively, and a controller which opens the on-off valve only when the difference between both the pressures detected by the detectors is equal to or larger than the fixed value.

Otherwise, the above-mentioned pressure control means may include a compression means for reducing the pressure difference by compressing the heating medium in the partitioned chamber, or may include an accumulator for reducing the pressure difference by storing part of the process fluid in the treatment chamber.

In addition to these pressure control means, it is also effective, as a means for suppressing the plastic deformation of the partition wall, to provide the partition wall so that it can deflect toward both the partitioned chamber and the treatment chamber, and reduce, in the event of the occurrence of a pressure difference between the partitioned chamber and the treatment chamber, the pressure difference by the deflection of the partition wall toward the low pressure side.

The high-pressure treatment apparatus according to the present invention may include a pressure-resistant container having a pressure-resistant wall which surrounds the treatment chamber inside and an open end which opens the treatment chamber to the outside; a lid member installed to the pressure-resistant container to seal the treatment chamber by closing the open end of the pressure-resistant container; a supply means for supplying a process fluid to the treatment chamber; a partition wall provided along the inside surface of the pressure-resistant container while having a thickness smaller than that of the pressure-resistant wall to form a partitioned chamber with the inside surface, the partition wall isolating the partitioned chamber from the treatment chamber so as to prevent inflow of the process fluid from the treatment chamber to the partitioned chamber; and a heating medium filled in the partitioned chamber to suppress heat transfer between the treatment chamber and the partitioned chamber.

In this apparatus, also, the heating medium filled in the partitioned chamber can suppress the transfer of heat between the treatment chamber and the partitioned chamber to thermally insulate the treatment chamber or gently change the temperature of the treatment chamber.

When this heating medium is composed of a fluid having heat insulating property, particularly, the function as heat-insulating layer can be imparted to the partitioned chamber.

The invention claimed is:

1. A high-pressure treatment apparatus for performing high-pressure treatment of a treatment object within a treatment chamber, comprising:
   a pressure-resistant container having a pressure-resistant wall which surrounds the treatment chamber inside and an open end which opens the treatment chamber to the outside;
   a lid member installed to said pressure-resistant container to seal the treatment chamber by closing the open end of said pressure-resistant container;
   a first supply line connected for supplying a process fluid to the treatment chamber;
   a partition wall provided along the inside surface of said pressure-resistant container while having a thickness smaller than that of the pressure-resistant wall to form a partitioned chamber with the inside surface, said partition wall fluidically isolating the partitioned chamber from the treatment chamber within said pressure-resistant container so as to prevent inflow of the process fluid from the treatment chamber to the partitioned chamber; and a heat transfer control means which controls transfer of heat between the treatment chamber and the partitioned chamber by heating or cooling a heating medium outside said container and feeding the resulting heating medium into the partitioned chamber, wherein said heat transfer control means includes a second line connected for feeding the heating medium into the partitioned chamber independent of the supplying of the process fluid to the treatment chamber.

2. The high-pressure treatment apparatus according to claim 1, wherein said heat transfer control means heats the treatment chamber through said partition wall by feeding the heating medium into the partitioned chamber while adjusting its temperature to be higher than that of the process fluid.

3. The high-pressure treatment apparatus according to claim 1, wherein said heat transfer control means cools the treatment chamber through said partition wall by feeding the heating medium into the partitioned chamber while adjusting its temperature to be lower than that of the process fluid.

4. The high-pressure treatment apparatus according to claim 1, wherein said heat transfer control means suppresses the transfer of heat between the treatment chamber and the partitioned chamber by feeding the heating medium into the partitioned chamber while adjusting its temperature to be equal to that of the process fluid.

5. The high-pressure treatment apparatus according to claim 1, wherein said heat transfer control means feeds, as the heating medium, a fluid having heating insulating property to the partitioned chamber.

6. The high-pressure treatment apparatus according to claim 1, wherein the apparatus further includes a convection suppressing means provided in the partitioned chamber to suppress convection of the heating medium within the partitioned chamber.

7. The high-pressure treatment apparatus according to claim 1, wherein the apparatus further includes a heating medium distribution promoting member provided on at least one surface of the inside surface of said pressure-resistant container and the outer surface of said partition wall to spread the heating medium over the whole surface of said partition wall.

8. The high-pressure treatment apparatus according to claim 1, wherein the apparatus further includes a pressure control means which controls the pressure in the partitioned chamber and the pressure in the treatment chamber to suppress occurrence of a pressure difference between the partitioned chamber and the treatment chamber.

9. The high-pressure treatment apparatus according to claim 8, wherein said pressure control means includes a pressure pipe having one end communicating with the partitioned chamber and the other end communicating with the treatment chamber; and a movable body provided within the pressure pipe so that it can move within said pressure pipe while dividing the inside of said pressure pipe into a chamber on the partitioned chamber side and a chamber on the treatment chamber side and sealing the inside of said pressure pipe to arrest the distribution of the heating medium and the process fluid between the chamber on the partitioned chamber side and the chamber on the treatment chamber side, and said movable body moves toward the low-pressure side in the event of the pressure difference, whereby the pressure difference is reduced.

10. The high-pressure treatment apparatus according to claim 8, wherein said pressure control means includes a pipe provided between the partitioned chamber and the treatment chamber so that both the chambers communicate with each other, and an opening and closing part switchable to a state for opening said pipe and a state for closing said pipe.

11. The high-pressure treatment apparatus according to claim 8, wherein said pressure control means includes a compression means for reducing the pressure difference by compressing the heating medium in the partitioned chamber.

12. The high-pressure treatment apparatus according to claim 8, wherein said pressure control means includes an accumulator for reducing the pressure difference by storing part of the process fluid in the treatment chamber.

13. The high-pressure treatment apparatus according to claim 1, wherein said partition wall is provided so that it can deflect toward both the partitioned chamber and the treatment chamber, and said partition wall is deflected to the low-pressure side in the event of a pressure difference between the partitioned chamber and the treatment chamber, whereby the pressure difference is reduced.

14. A high-pressure treatment apparatus for performing high-pressure treatment of a treatment object within a treatment chamber, comprising:
- a pressure-resistant container having a pressure-resistant wall which surrounds the treatment chamber inside and an open end which opens the treatment chamber to the outside;
- a lid member installed to said pressure-resistant container to seal the treatment chamber by closing the open end of said pressure-resistant container;
- a supply line connected for supplying a process fluid to the treatment chamber;
- a partition wall provided along the inside surface of said pressure-resistant container while having a thickness smaller than that of the pressure-resistant wall to form a partitioned chamber with the inside surface, said partition wall fluidically isolating the partitioned chamber from the treatment chamber within said pressure-resistant container so as to prevent inflow of the process fluid from the treatment chamber to the partitioned chamber; and
- a heating medium filled in the partitioned chamber to suppress heat transfer between the treatment chamber and the partitioned chamber.

15. The high-pressure treatment apparatus according to claim 14, wherein said heating medium is composed of a fluid having heat insulating property.

* * * * *